United States Patent
Lewin et al.

(10) Patent No.: US 11,637,812 B2
(45) Date of Patent: Apr. 25, 2023

(54) DYNAMIC FORWARD PROXY CHAINING

(71) Applicant: Microsoft Technology Licensing, LLC, Redmond, WA (US)

(72) Inventors: Guy Lewin, New York City, NY (US); Michel Peterson, haMerkaz (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 225 days.

(21) Appl. No.: 17/069,512

(22) Filed: Oct. 13, 2020

(65) Prior Publication Data
US 2022/0116361 A1    Apr. 14, 2022

(51) Int. Cl.
*G06F 15/16* (2006.01)
*H04L 9/40* (2022.01)
(Continued)

(52) U.S. Cl.
CPC .......... *H04L 63/0281* (2013.01); *H04L 12/66* (2013.01); *H04L 49/3009* (2013.01); *H04L 63/0236* (2013.01); *H04L 69/22* (2013.01)

(58) Field of Classification Search
CPC . H04L 63/0281; H04L 49/3009; H04L 69/22; H04L 67/02
See application file for complete search history.

(56) References Cited

U.S. PATENT DOCUMENTS 6,345,303 B1 * 2/2002 Knauerhase ........ H04L 67/1001
                                                                709/219
6,785,705 B1 * 8/2004 Kocherlakota ......... H04L 67/14
                                                                709/238
(Continued)

FOREIGN PATENT DOCUMENTS

WO    2017054578 A1    4/2017

OTHER PUBLICATIONS

Kim, et al., "A Proxy Server By-passing Scheme for the Chained HTTP Proxy Networks", In Proceedings of International Conference on Information and Communication Technology Convergence (ICTC), Oct. 22, 2014, pp. 886-887.

(Continued)

*Primary Examiner* — Hieu T Hoang
(74) *Attorney, Agent, or Firm* — Weaver IP L.L.C.

(57) ABSTRACT

Methods for dynamic forward proxy chaining are performed by systems and devices. A forward proxy server receives an electronic communication message that includes destination information in a header and payload information. Destination information includes an ordered set of subsequent destination identifiers associated with subsequent forward proxy servers and an ultimate destination identifier for the electronic communication message. The destination information in the electronic communication message is modified by the forward proxy server to generate a modified electronic communication message. Based on proxy operations performed by the forward proxy server, destination information is modified by removing destinations, adding destinations, altering ports for destinations, and other modifications. The forward proxy server establishes an electronic connection with a next destination based on the destination information or the modified destination information, and the modified electronic communication message is provided to the next destination by the forward proxy server via the electronic connection.

20 Claims, 6 Drawing Sheets

(51) Int. Cl.
*H04L 12/66* (2006.01)
*H04L 49/00* (2022.01)
*H04L 69/22* (2022.01)

(56) References Cited

U.S. PATENT DOCUMENTS

| | | | |
|---|---|---|---|
| 10,397,300 B2* | 8/2019 | Lim | H04L 67/288 |
| 10,873,647 B1* | 12/2020 | Pilkauskas | H04L 43/50 |
| 2002/0165928 A1* | 11/2002 | Landfeldt | H04L 67/10 |
| | | | 709/213 |
| 2007/0283023 A1* | 12/2007 | Ly | H04L 67/56 |
| | | | 709/227 |
| 2015/0326473 A1* | 11/2015 | Dunbar | H04L 12/4633 |
| | | | 370/392 |
| 2015/0381478 A1* | 12/2015 | Zhang | H04L 45/306 |
| | | | 370/392 |
| 2019/0037054 A1* | 1/2019 | Bifulco | H04L 69/163 |
| 2019/0068495 A1* | 2/2019 | Jeuk | H04L 45/02 |
| 2019/0266502 A1* | 8/2019 | Moser | G06F 11/3495 |
| 2020/0169502 A1* | 5/2020 | Li | H04L 12/66 |
| 2020/0274945 A1* | 8/2020 | Rolando | H04L 67/101 |
| 2021/0306303 A1* | 9/2021 | Lewin | H04L 63/10 |

OTHER PUBLICATIONS

"International Search Report and Written Opinion Issued in PCT Application No. PCT/US21/043101", dated Nov. 5, 2021, 13 Pages.

* cited by examiner

DYNAMIC FORWARD PROXY CHAINING

BACKGROUND

Current solutions for forward proxies provide two standard ways to define the route for a Transmission Control Protocol (TCP) session: Hypertext Transfer Protocol (HTTP) CONNECT and SOCKS Protocol. These protocols are commonly used by many networking infrastructures, and both allow for handing metadata to the proxy server about the next destination for the electronic message/packet. Currently, forward proxy chaining is done by configuring forward proxy servers to send the same request, including the same, original proxy header, to another proxy server, instead of the intended destination. However, HTTP CONNECT tunnels and the SOCKS protocol are both limited to specifying a single next destination (i.e., a next "hop"), and standard HTTP CONNECT and SOCKS servers can only affect the next hop, not additional, subsequent hops according to the immutable, original proxy header.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for dynamic forward proxy chaining are performed by systems and devices. Methods include generating electronic communication messages to include a forward proxy server chain of two or more forward proxy servers. Methods also include modifying destination information in electronic communication messages by individual forward proxy servers in a chain of forward proxy servers. A forward proxy server receives an electronic communication message that includes destination information and payload information. The destination information includes an ordered set of subsequent destination identifiers associated with subsequent forward proxy servers, as well as an ultimate destination identifier for the electronic communication message. The forward proxy server performs forward proxy server operations, and destination information is modified, based on these operations, by removing destinations, adding destinations, altering ports for destinations, and other modifications. The destination information is modified by the forward proxy server to generate a modified electronic communication message. The forward proxy server establishes an electronic connection with a next forward proxy server in the chain, which is a next destination hop, based on the received destination information or the modified destination information. The modified electronic communication message is provided to the next destination by the forward proxy server via the electronic connection.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
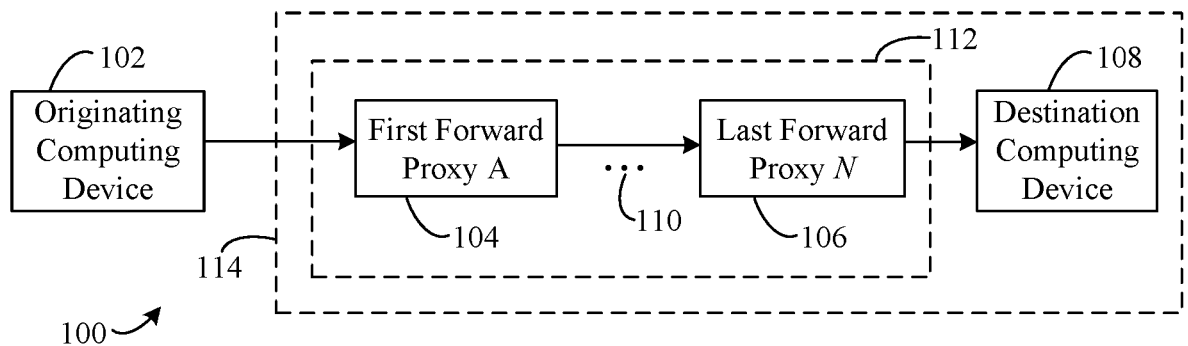
FIG. 1 shows a block diagram of a system for dynamic forward proxy chaining, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for dynamic forward proxy chaining. Section III below describes example mobile and computing device embodiments that may be used to implement features of the embodiments described herein. Section IV below describes additional examples and advantages, and Section V provides some concluding remarks.

II. Example Embodiments for Dynamic Forward Proxy Chaining

Proxy servers act as intermediaries for communications between computing devices. Reverse proxy servers face a host/destination device, and function as front-end protection for the host/destination network against external devices communicating therewith and requesting resources, whereas forward proxy servers face external networks, such as the Internet, as intermediaries for external devices to communicate with a host/destination device. Put another way, a forward proxy server is positioned in front of a specific group of one or more clients and functions as an intermediary for such clients to contact any host/destination device, e.g., a host server. In other words, a forward proxy server acts on behalf of a client, while a reverse proxy server acts on behalf of a host server. Typical forward proxy servers, such as Transmission Control Protocol (TCP) proxy servers, receive communications from originating client devices, perform a proxy server function(s), and then provide the communications to a host server specified in the communication as the destination.

Current solutions for forward proxy servers provide two standard ways to define the route for a TCP session: Hypertext Transfer Protocol (HTTP) CONNECT and SOCKS Protocol, e.g., SOCKS4 and SOCKS5. However, HTTP CONNECT tunnels and these SOCKS protocol versions are limited to specifying a single next destination, or a next "hop," as standard HTTP CONNECT and SOCKS servers can only affect the next hop, not additional, subsequent hops according to the immutable, original proxy header. Therefore, current forward proxy chaining is accomplished by configuring forward proxy servers to send the same request, including the same, original proxy header, to another proxy server, instead of the intended destination.

Microservices are smaller groups or collections of services and light-weight applications that communicate, e.g., via application programming interfaces (APIs) and perform specific functions/operations for a larger, overall application. In the context of microservices, although the descriptions herein are not so limited, a host server or host service may use a number of microservices to perform functions associated with received electronic communications. That is, rather than have a monolithic framework for services and a centralized forward proxy server, which may involve additional usage of network bandwidth, be cumbersome to maintain, and cause service disruptions during updating, debugging, etc., a number of microservices may be deployed independently to perform the same or similar functions as the monolithic framework.

Thus, to avoid the issues noted above, it is necessary in microservices deployments to determine a route for each incoming electronic communication that is built from multiple forward proxy servers, e.g., associated with the multiple microservices, that will handle a single connection. This routing may also be changed along the way, dynamically, by individual forward proxy servers that determine a need to chain the incoming requests to further handlers not initially specified for the electronic communications and/or to remove destinations previously specified that are determined to not be necessary. Therefore, dynamic forward proxy chaining, which is not supported by current forward proxy solutions, is needed to alter the next "hops" in a forward proxy chain such that incoming electronic communications are properly handled by systems.

Accordingly, methods for dynamic forward proxy chaining are performed by systems and devices. Methods include generating electronic communication messages to include a forward proxy server chain of two or more forward proxy servers. Methods also include modifying destination information in electronic communication messages by individual forward proxy servers in a chain of forward proxy servers. A forward proxy server receives an electronic communication message that includes destination information and payload information. The destination information includes an ordered set of subsequent destination identifiers associated with subsequent forward proxy servers, as well as an ultimate destination identifier for the electronic communication message. The forward proxy server performs forward proxy server operations, and destination information is modified, based on these operations, by removing destinations, adding destinations, altering ports for destinations, and other modifications. The destination information is modified by the forward proxy server to generate a modified electronic communication message. The forward proxy server establishes an electronic connection with a next forward proxy server in the chain, which is a next destination hop, based on the received destination information or the modified destination information. The modified electronic communication message is provided to the next destination by the forward proxy server via the electronic connection.

The embodiments herein provide solutions that improve system that utilize forward proxy servers, as well forward proxy server chaining for two or more forward proxy servers that may be configured in electronic communication messages at their generation and during their flight through the chain. These and other embodiments for dynamic forward proxy chaining will be described in further detail below in association with the Figures, and in the Sections/Subsections that follow.

Systems, devices, and apparatuses may be configured in various ways for dynamic forward proxy chaining. For instance, FIG. 1 is a block diagram of a system 100, according to embodiments. System 100 is configured for dynamic forward proxy chaining, according to embodiments. As shown in FIG. 1, system 100 includes an originating computing device 102 ("originating device" 102), a first forward proxy 104 through a last forward proxy 106, and a destination computing device 108 ("destination device" 108) that communicate in embodiments via with each other over a network 112 and/or a network 114. It should be noted that in various embodiments different numbers of originating devices, destination devices, and/or forward proxy servers are present, and additionally, according to embodiments, any combination of the systems and/or components illustrated in FIG. 1 are present in system 100. For example, embodiments of system 100 that comprise any number of forward proxy servers (forward proxy A through forward proxy N) are included herein, where embodiments having an additional forward proxy(ies) 110 are also contemplated.

Network 112 and/or network 114 comprise different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments. For example, as exemplarily illustrated, network 112 may comprise the Internet with first forward proxy 104 through last forward proxy 106 being forward proxy servers at one or more geographic locations. In another example, network 114, as exemplarily illustrated, may be a cloud-based platform network and/or enterprise network to which originating device 102 connects via the Internet or another network. Additionally, forward proxy servers such as first forward proxy 104 through last forward proxy 106 may be implemented in any combination of network 112 and/or network 114.

Figure 8:
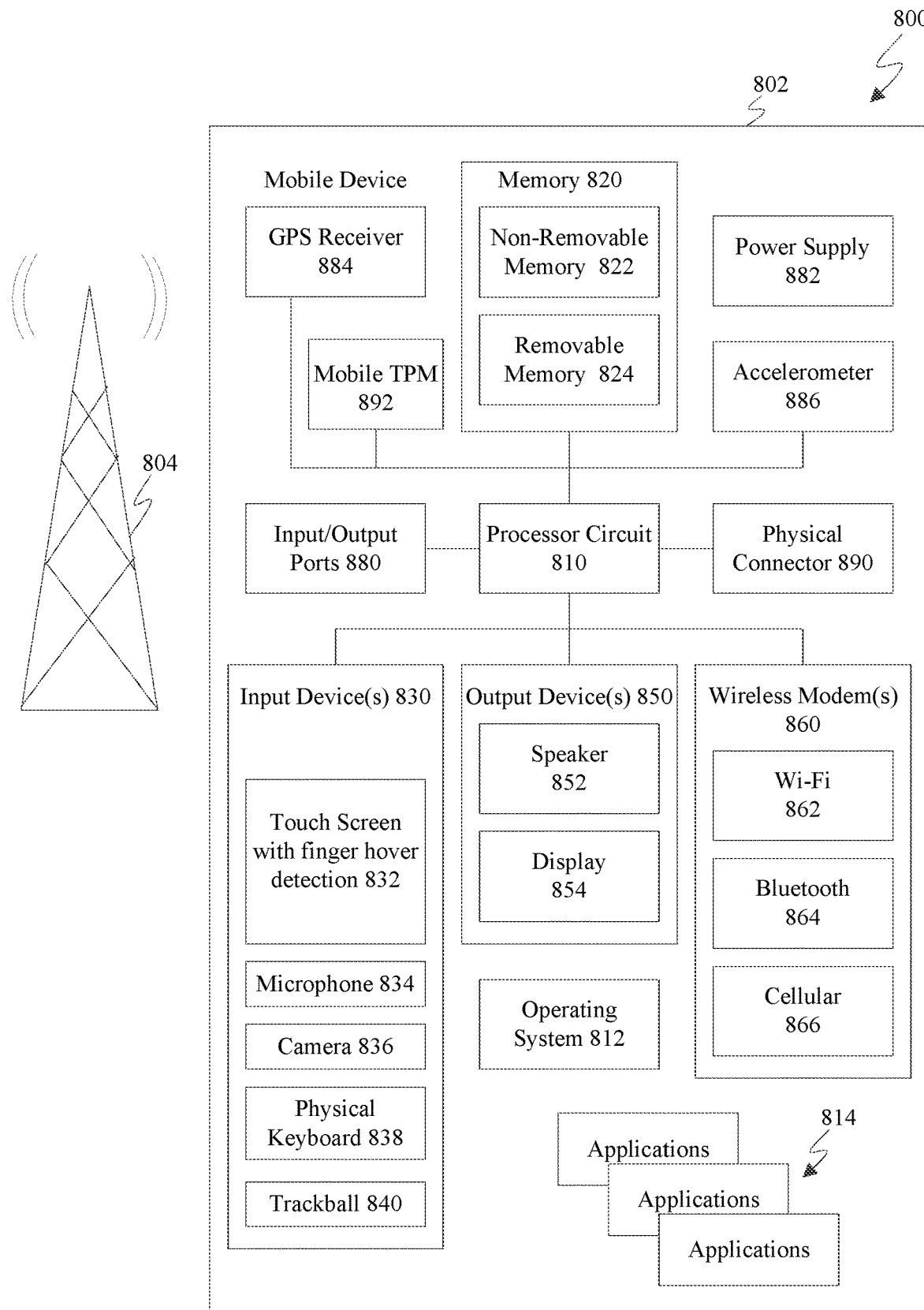
FIG. 8 shows a block diagram of an example mobile device that may be used to implement embodiments.

Originating device 102 in different embodiments is any number, type, or combination of computing devices or computing systems, including a terminal, a personal computer, a laptop computer, a tablet device, a smart phone, a personal digital assistant, a server(s), a gaming console, and/or the like, that may include internal/external storage devices, that are utilized to execute and perform functions/operations described herein, as well as for performing client-side functions/operations of client-server scenarios associated with embodiments, such as those for dynamic forward proxy chaining. In embodiments, originating device 102 may be a computing device of a tenant that utilizes destination device 108 for hosting applications and/or services, or may be a computing device of an end user that accesses the applications and/or services hosted by destination device 108. Originating device 102 may be a computing device of an end-user such as a customer, or of an administrator or internal user associated with destination device 108. Originating device 102 also includes additional components (not shown for brevity and illustrative clarity) including, but not limited to, components and subcomponents of other devices and/or systems herein, e.g., as shown in FIG. 8 and/or FIG. 9 described below, in accordance with embodiments.

Forward proxy servers, such as first forward proxy 104 through last forward proxy 106, comprise one or more server computers or computing devices, which may include one or more distributed or "cloud-based" servers. In embodiments, first forward proxy 104 through last forward proxy 106 may be implemented in a single physical server or computing device, while in other embodiments, any number of forward proxy servers may be implemented on different physical servers or computing devices. Each of first forward proxy 104 through last forward proxy 106 may be implemented as software, hardware, firmware, and/or any combination thereof. In embodiments, first forward proxy 104 through last forward proxy 106 are implemented as forward proxy servers that respectively correspond to one or more microservices associated with destination device 108, and are respectively configured to perform forward proxy operations corresponding to such microservices. First forward proxy 104 through last forward proxy 106 may each include a forward proxy chain manager, described in further detail below, that is configured to perform operations and functions for dynamic forward proxy chaining, including without limitation, adding one or more destination hops for other forward proxy servers to an incoming electronic communication message, removing/deleting one or more destination hops for other forward proxy servers to an incoming electronic communication message, altering characteristics of one or more destination hops for other forward proxy servers to an incoming electronic communication message, and/or the like.

Destination device 108, in embodiments, comprises one or more server computers or computing devices, which may include one or more distributed or "cloud-based" servers. Destination device 108 is configured to set up first forward proxy 104 through last forward proxy 106 to perform forward proxy operations. In embodiments, destination device 108 is associated with, or is a part of, a cloud-based service platform, and in some embodiments, destination device 108 comprises an on-premises server(s) in addition to, or in lieu of, cloud-based servers. Destination device 108 is configured to host and execute any type of service and/or application accessed/utilized by a user of originating device 102, e.g., a DB server application, an email application/service, a document sharing service, productivity applications, etc. (not shown for brevity and illustrative clarity). Various systems/devices herein, such as destination device 108, are configured to receive electronic communications (e.g., data packets, requests, and/or the like), from user devices like originating device 102 via forward proxy servers (e.g., first forward proxy 104 through last forward proxy 106) that are themselves configured to perform functions/operations for dynamic forward proxy chaining, according to embodiments. Destination device 108 also includes additional components (not shown for brevity and illustrative clarity) including, but not limited to, components and subcomponents of other devices and/or systems herein, e.g., as shown in FIGS. 8 and/or 9 described below, in embodiments.

As noted and as described herein, first forward proxy 104 through last forward proxy 106 and destination device 108 are applicable to any type of system for dynamic forward proxy chaining, according to embodiments. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as those hosted by destination device 108, etc., are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants. In some embodiments herein, tenants of cloud-based implementation services may communicate with cloud-based servers and hosts via forward proxy servers that perform forward proxy functions/operations and are configured to perform dynamic forward proxy chaining, as described herein.

Forward proxy servers, such as first forward proxy 104 through last forward proxy 106, may be configured in various ways for dynamic forward proxy chaining. For instance, referring now to FIG. 2, a block diagram of a system 200 is shown for dynamic forward proxy chaining, according to an example embodiment. System 200 is configured to be an embodiment of system 100 of FIG. 1, one or more of first forward proxy 104 through last forward proxy 106. System 200 is described as follows.

Figure 2:
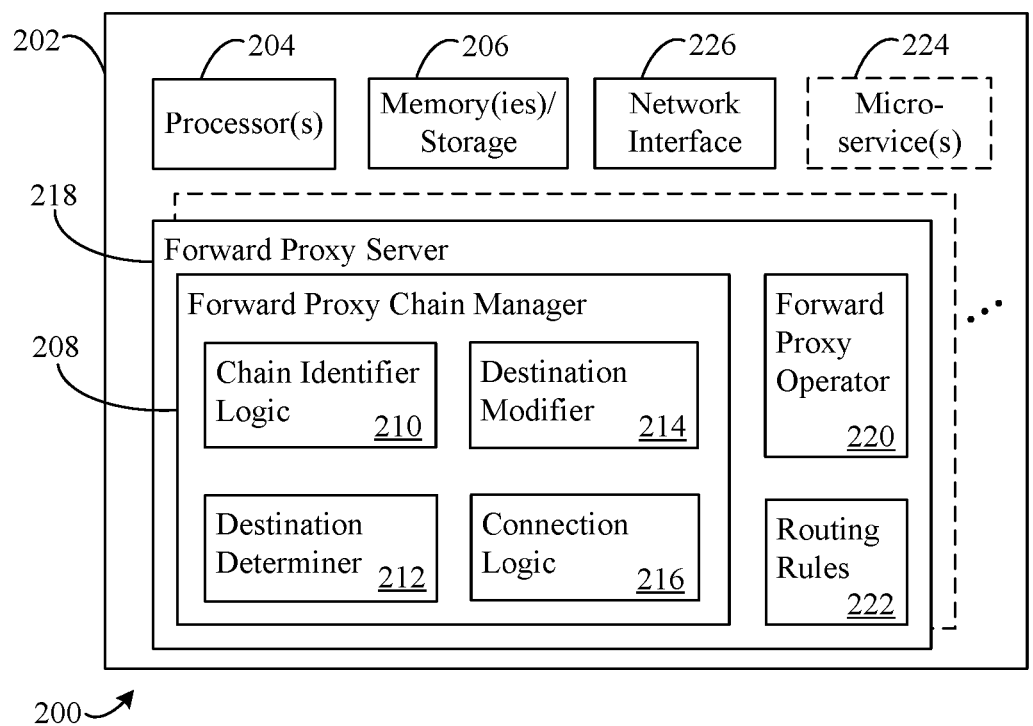
FIG. 2 shows a block diagram of a computing system configured for dynamic forward proxy chaining, according to an example embodiment.

System 200 includes a computing system 202, which is an embodiment of a system, server, or computing device on which one or more of first forward proxy 104 through last forward proxy 106 of FIG. 1 are implemented, and which is any type of server or computing system, as mentioned elsewhere herein, or as otherwise known, including one or more cloud-based servers. As shown in FIG. 2, computing system 202 includes one or more processors ("processor") 204, one or more of a memory and/or other physical storage device ("memory") 206, as well as one or more network interfaces ("network interface") 226. Computing system 202 includes one or more forward proxy servers 218 (also "forward proxy server" 218 herein for simplicity) that are respective embodiments of first forward proxy 104 through last forward proxy 106. Forward proxy server 218 is configured to perform aspects of dynamic forward proxy chaining, as described herein, including but without limitation, those described above with respect to FIG. 1, and/or the like. In embodiments, while not shown for brevity and illustrative clarity, forward proxy server 218 comprises a portion of, or corresponds to, an application, a service, a microservice, an operating system, and/or the like that is associated with host/server, e.g., destination device 108. As an illustrative example, computing system 202 may also include one or more microservices 224, or may be associated with, e.g., communicatively coupled to external implementations of, one or more microservices 224 that are configured to, as would be understood by one of skill in the relevant art(s) having the benefit of this disclosure.

System 200 also includes additional components (not shown for brevity and illustrative clarity) including, but not limited to, components and subcomponents of other devices and/or systems herein, as well as those described below with respect to FIG. 8 and/or FIG. 9, such as an operating system, APIs that communicate between microservices, etc., according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently, and cores of processor 204 may be grouped with portions of memory 206. Processor 204 may comprise circuitry that is configured to execute computer program instructions such as, but not limited to, embodiments of forward proxy server 218, including one or more of the components thereof as described herein, which may be implemented as computer program instructions to perform dynamic forward proxy chaining, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, forward proxy server 218, including one or more of the components thereof as described herein, etc.

Network interface 226 may be any type or number of wired and/or wireless network adapter, modem, etc., configured to enable system 200, including computing system 202, to communicate with other devices and/or systems over a network, including cloud networks, such as communications between computing system 202 and other devices, systems, hosts, etc., of system 100 in FIG. 1 over a network such as network 112 and/or network 114.

Forward proxy server 218 of computing system 202 includes a plurality of components for performing the functions and operations described herein for dynamic forward proxy chaining, in embodiments. As illustrated, forward proxy server 218 includes a forward proxy chain manager 208, a forward proxy operator 220, and routing rules 222. Forward proxy chain manager 208 includes chain identifier logic 210, a destination determiner 212, a destination modifier 214, and connection logic 216, although additional components, as described herein or otherwise, are also included in some embodiments.

Forward proxy operator 220 is configured to perform one or more forward proxy server operations and/or functions. For example, Forward proxy operator 220 may perform forward proxy server operations and/or functions for incoming electronic communication messages, including but without limitation, audit, traffic detection, authentication, policy evaluation, and/or the like. Forward proxy operator 220 may perform one or more of its operations and/or functions based on routing rules 220. Forward proxy operator 220 may perform one or more of its forward proxy server operations and/or functions based on routing rules 222.

In embodiments, routing rules 222 provide actions to be taken and/or forward proxy server routing requirements. In other words, the next forward proxy server hop, or hops, for an electronic communication message may be determined based on routing rules 222. Routing rules 222 are defined based on different factors, including but not limited to, an originating sender of an electronic communication message, a request and/or data in the payload of an electronic communication message, auditing requirements of a system, traffic detection requirements of a system, authentication requirements of a system, policies enforced by a system, a status of another associated forward proxy server, and/or the like.

Chain identifier logic 210 is configured to determine whether a proxy chain identifier is present in message information of an electronic communication message, in embodiments. For example, chain identifier logic 210 is configured to determine that a proxy chain identifier, e.g., a specified identifier that indicates an ordered set or list of forward proxy servers is provided, is present in the message information of the electronic communication message, such as in the header information that may comprise destination information. The proxy chain identifier may comprise words, alphanumeric characters, punctuation characters, symbols, and/or the like, that are recognized by chain identifier logic 210 of forward proxy server 218, and may be a prefix for the ordered set of forward proxy servers.

Destination determiner 212 is configured to determine and/or identify any intermediate destinations or hops, i.e., forward proxy servers, for an electronic communication message, listed in association with a proxy chain identifier in destination information, in embodiments. Destination determiner 212 may be configured to determine if an immediately next, or subsequently next, forward proxy server is appropriate, or desired based on configurations, for the electronic communication message. Such a determination, in embodiments, is made by destination determiner 212 based on at least one of a result of the forward proxy operations performed by forward proxy operator 220 of proxy forward proxy server 218, routing rules 222, and/or other information associated with the electronic communication message. In some embodiments, destination determiner 212 is configured to identify an identifier in the destination information that corresponds to the forward proxy server with which destination determiner 212 is associated, i.e., destination determiner 212 can identify its own forward proxy server in embodiments to determine the next destination, after its identifier, that is included in the order set of forward proxy servers.

Destination modifier 214 is configured in embodiments to modify destination information in an electronic communication message, i.e., forward proxy server destinations, or hops, provided in an ordered set/list of forward proxy servers. Modifications include, but are not limited to, removing an identifier of a forward proxy server from the destination information, removing a subsequent destination identifier of a forward proxy server from the destination information, adding a subsequent destination identifier of a forward proxy server, replacing a subsequent destination identifier of a forward proxy server with another subsequent identifier of another forward proxy server, altering a port identifier of a subsequent destination identifier of a forward proxy server, and/or the like, according to embodiments. In embodiments, modifying electronic communication messages by destination modifier 214 generates modified electronic communication messages with modified destination information.

Connection logic 216 is configured in embodiments to create an electronic communication connection between a forward proxy server and another forward proxy server, or between a forward proxy server and an ultimate destination of an electronic communication message. In embodiments, connection logic 216 may comprise a portion of forward proxy operator 220 in addition to, or in lieu of, comprising a portion of forward proxy chain manager 208. Connection logic 216 is configured to create electronic communication connections, e.g., a socket connection to a specific port, based on received destination information of electronic communication messages and/or modified destination information of modified electronic communication messages.

As noted above for FIGS. 1 and 2, embodiments herein provide for dynamic forward proxy chaining. System 100 of FIG. 1 and/or system 200 of FIG. 2 may be configured to perform such functions and operations. It is further contemplated that the systems and components described above are configurable to be combined in any way. For example, forward proxy server 218, which may be an embodiment of one of first forward proxy 104 through last forward proxy 106 may be implemented as a logically separate instance of a forward proxy server, e.g., as part of an operating system or a stand-alone service/application, or may be implemented as a service/application on a computing device that executes a microservice. Additionally and/or alternatively, any number of instances of forward proxy server 218 may be implemented on a single computing device.

Figure 3:
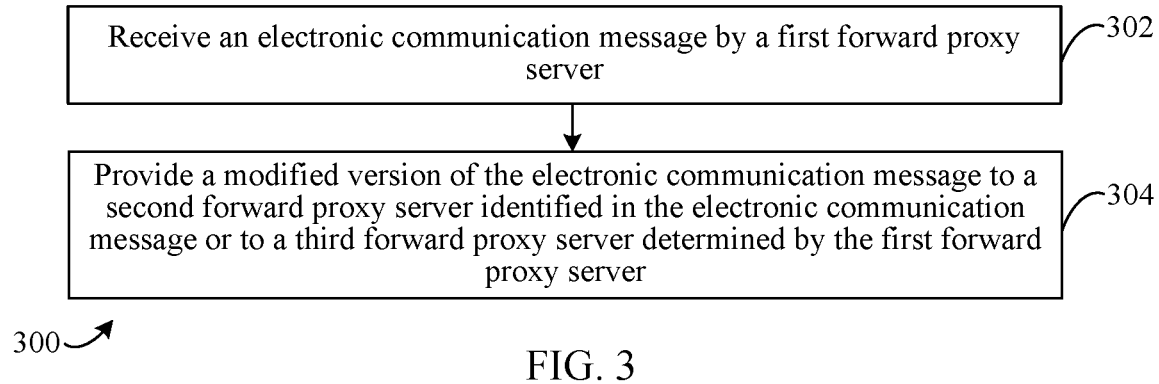
FIG. 3 shows a flowchart for dynamic forward proxy chaining, in accordance with an example embodiment.

Turning now to FIG. 3, a flowchart 300 for dynamic forward proxy chaining is shown, according to example embodiments. System 100 in FIG. 1 and/or system 200 in FIG. 2 operate according to flowchart 300, in embodiments. Further structural and operational examples will be apparent to persons skilled in the relevant art(s) based on the following descriptions. Flowchart 300 is described below with respect to system 200 of FIG. 2.

Flowchart 300 begins with step 302. In step 302, an electronic communication message is received by a first forward proxy server. For instance, forward proxy server 218 is configured to receive electronic communications. In embodiments, the electronic communication message is a message packet provided by originating device 102 to a host server, e.g., destination device 108, of FIG. 1. In accordance with the system configuration, forward proxy server 218, as an embodiment of one of first forward proxy 104 through last forward proxy 106 receives the electronic communication message provided by originating device 102 prior to the host server, e.g., destination device 108, receiving it. On receipt, forward proxy server 218 is configured to perform one or more operations and/or functions associated with the electronic communication message.

In step 304, a modified version of the electronic communication message is provided to a second forward proxy server identified in the electronic communication message or to a third forward proxy server determined by the first forward proxy server. For example, as noted above, forward proxy server 218 is configured to modify received electronic communication messages, including destination information that may be included in a header of the electronic communication messages, to generate a modified version thereof. Forward proxy operator 220 of forward proxy server 218 is configured to perform its forward proxy operations, and based on the result of such operations and/or other factors described herein, e.g., system status or configurations, message characteristics or attributes, and/or the like, destination determiner 212 of forward proxy server 218 determines the next destination hop from the ordered set of destinations based on chain identifier logic 210 identifying the proxy chain identifier, and destination modifier 214 modifies the destination information accordingly thus generating the modified version of the electronic communication message. This modified version is provided to another forward proxy server, via connection logic 216, based on destination information in the received electronic communication message from step 302 and/or on modified destination information as described herein.

Figure 4:
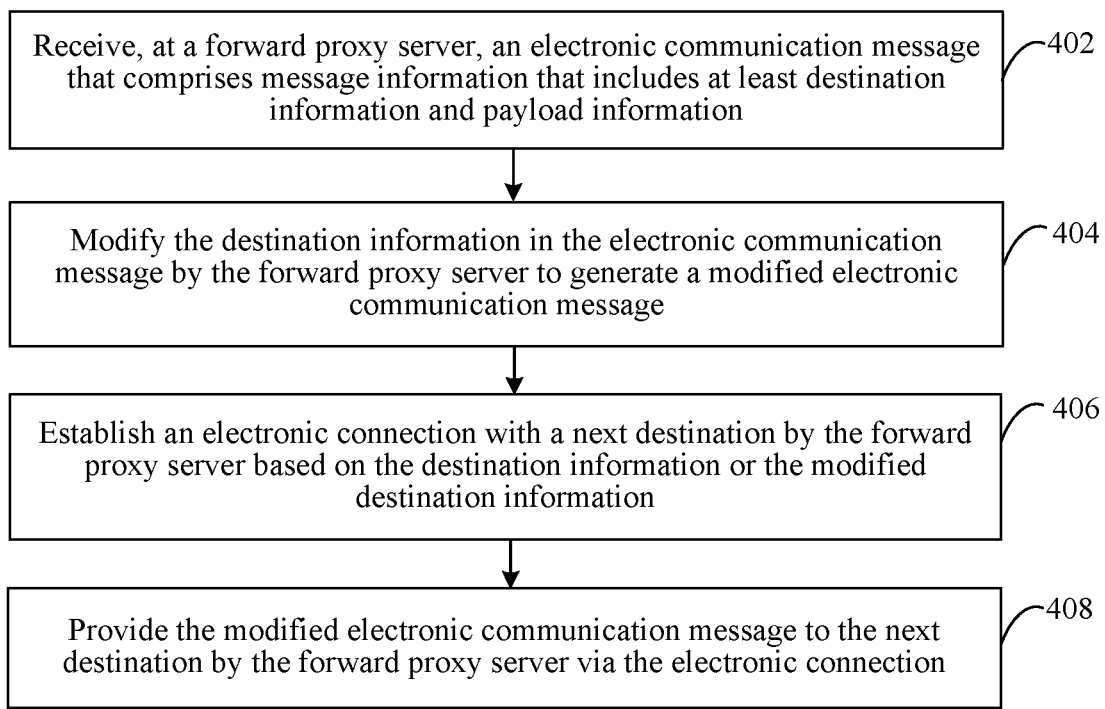
FIG. 4 shows a flowchart for dynamic forward proxy chaining, in accordance with an example embodiment.

FIG. 4 shows a flowchart 400 for dynamic forward proxy chaining, according to example embodiments. System 100 in FIG. 1 and/or system 200 in FIG. 2 operate according to flowchart 400, which is an embodiment of flowchart 300 of FIG. 3. Further structural and operational examples will be apparent to persons skilled in the relevant art(s) based on the following descriptions. Flowchart 400 is described below with respect to system 100 in FIG. 1 and system 200 of FIG. 2.

Flowchart 400 begins with step 402. In step 402, an electronic communication message that comprises message information that includes at least destination information and payload information is received at a forward proxy server. For instance, forward proxy server 218 of system 200 in FIG. 2 is configured to receive electronic communications intended for a destination computing device, such as a host server. In embodiments, the electronic communication message is a message packet provided by originating device 102 to a host server, e.g., destination device 108, of FIG. 1. As noted above, forward proxy server 218 may be an embodiment of one of first forward proxy 104 through last forward proxy 106 of FIG. 1. On receipt, forward proxy server 218 is configured to perform one or more operations and/or functions associated with the electronic communication message. As non-limiting examples, forward proxy server 218 may be a forward proxy server for auditing, traffic detection, authentication, policy evaluation, and/or the like, according to system configurations. In embodiments, operations and/or functions associated with such types of forward proxy servers may be performed by forward proxy operator 220 of forward proxy server 218 subsequent to the receipt of the electronic communication message in step 402.

In step 404, the destination information in the electronic communication message is modified by the forward proxy server to generate a modified electronic communication message. For example, forward proxy server 218 is configured to modify a received electronic communication message, including destination information that may be included in a header of the electronic communication message, to generate a modified electronic communication message via destination modifier 214. In embodiments, based on the result of forward proxy operations/functions performed by forward proxy operator 220 and/or other factors described herein, destination determiner 212 of forward proxy server 218 determines the next destination hop, i.e., the next forward proxy server that was listed to receive the electronic communication message, from the ordered set of destinations in the destination information based on chain identifier logic 210 identifying the proxy chain identifier in the electronic communication message that denotes the ordered set. Destination modifier 214 then modifies the destination information accordingly to generate the modified electronic communication message.

Modifications that destination modifier 214 is configured to make include, but are not limited to, removing an identifier of a forward proxy server from the destination information, removing a subsequent destination identifier of a forward proxy server from the destination information, adding a subsequent destination identifier of a forward proxy server, replacing a subsequent destination identifier of a forward proxy server with another subsequent identifier of another forward proxy server, altering a port identifier of a subsequent destination identifier of a forward proxy server, and/or the like, according to embodiments. These modifications are described in further detail below with respect to FIG. 6. Destination determiner 212 may then revise the determination of the next hop based on destination information as modified by destination modifier 214 and/or based on the unmodified destination information from the electronic communication message received in step 402.

In step 406, an electronic connection is established with a next destination by the forward proxy server based on the destination information or the modified destination information. For instance, connection logic 216 is configured to establish an electronic connection between forward proxy server 218 and a next destination hop, i.e., the next forward proxy server that will receive the now modified electronic communication message. Connection logic 216 is configured to establish the electronic connection based on a next destination listed in the ordered set of destinations from the destination information, which may be the destination information in the received electronic communication message and/or the modified destination information as modified by destination modifier 214.

As an example, with reference to FIG. 1 and where forward proxy server 218 corresponds to first forward proxy 104, destination information in the received electronic communication message may comprise an ordered set of destinations including an identifier for last forward proxy 106, which is modified by destination modifier 214 to add another forward proxy of additional forward proxy(ies) 110 to the ordered set. In a scenario where the identifier of the other forward proxy of additional forward proxy(ies) 110 is added in the order set to be before the identifier for last forward proxy 106, connection logic 216 establishes the electronic connection to the other forward proxy. On the other hand, in a different scenario where the identifier of the other forward proxy of additional forward proxy(ies) 110 is added in the order set to be after the identifier for last forward proxy 106, connection logic 216 establishes the electronic connection to last forward proxy 106, as the next hop, and the other forward proxy subsequently receives the electronic communication message if no other changes to the destination information are made by last forward proxy 106.

In step 408, the modified electronic communication message is provided to the next destination by the forward proxy server via the electronic connection. For example, forward proxy server 218 is configured to provide the electronic communication message modified by destination modifier 214 in step 404 to the next destination in the ordered set, as described above, via the electronic connection established in step 406. In embodiments, forward proxy server 218 provides the modified electronic communication message utilizing connection logic 216 and/or forward proxy operator 220. When the list in the ordered set of destinations is exhausted, i.e., an empty set, or when the proxy chain identifier and the ordered set are removed from the electronic communication message by a forward proxy server, the electronic communication message is provided the current forward proxy server to the ultimate destination (e.g., as exemplarily shown in FIG. 1 for destination device 108).

Figure 5:
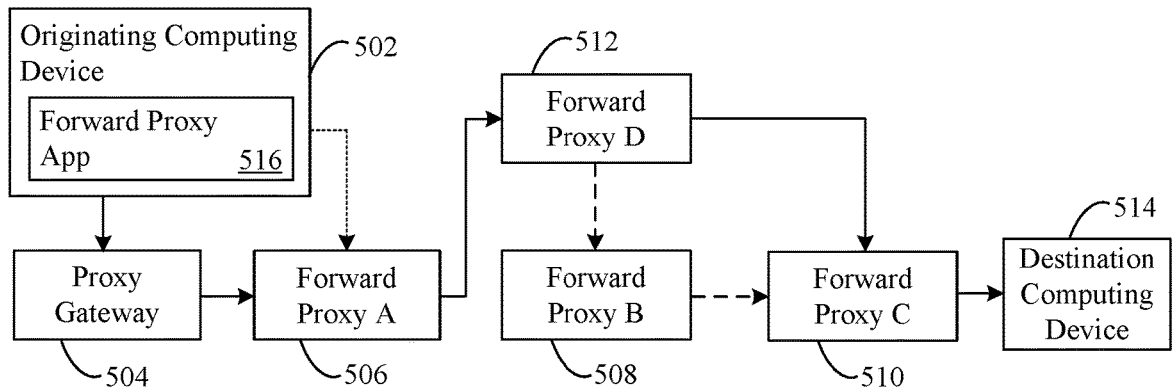
FIG. 5 shows a block diagram of a system for dynamic forward proxy chaining, in accordance with an example embodiment.
Figure 6:
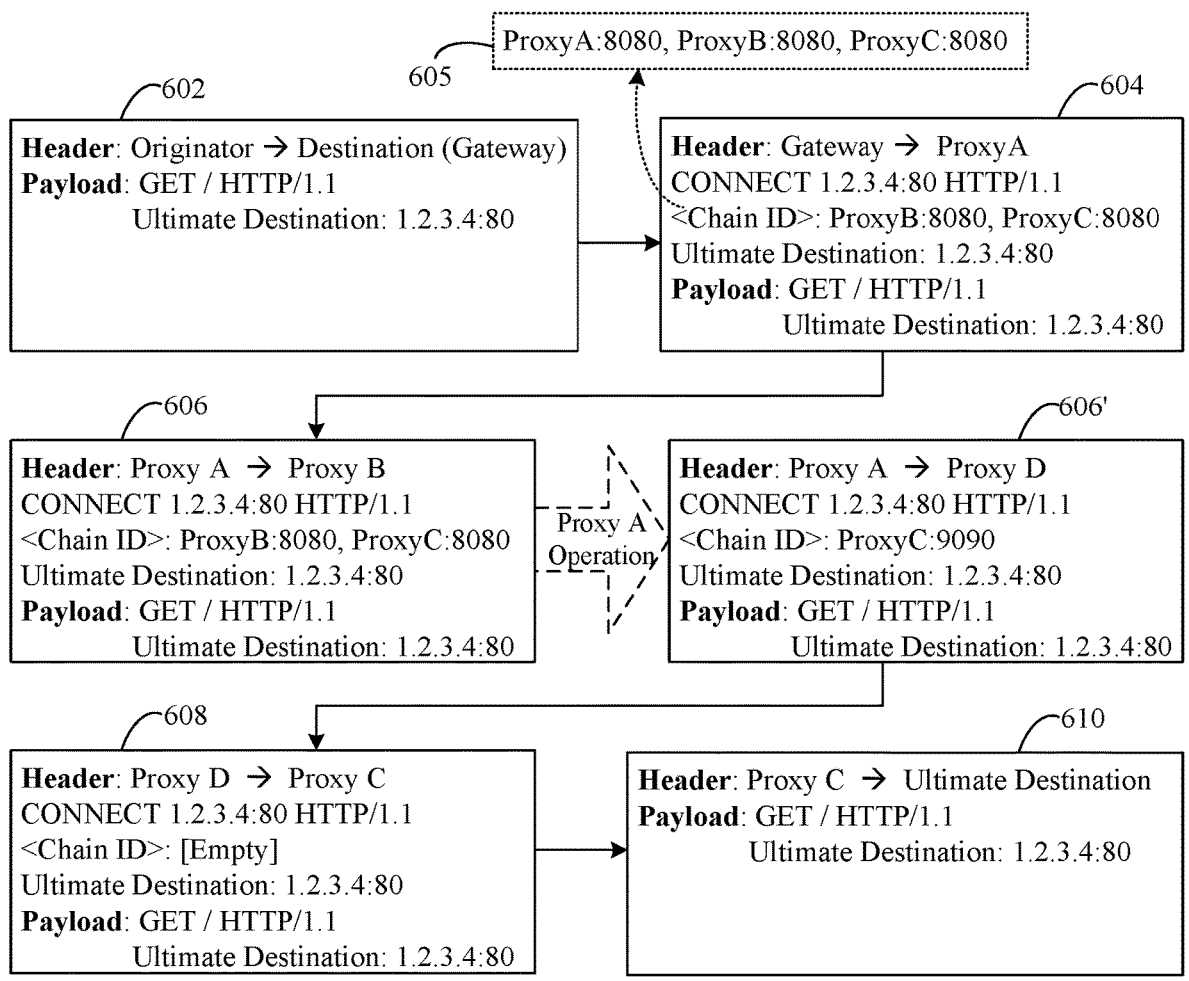
FIG. 6 shows a flow diagram of electronic communication message information for dynamic forward proxy chaining, in accordance with an example embodiment.

FIG. 5 and FIG. 6 will now be described.

FIG. 5 shows a system 500 for dynamic forward proxy chaining, according to an example embodiment. System 500 may be an embodiment of system 100 in FIG. 1 and/or system 200 in FIG. 2, and may operate according to flowchart 400 in FIG. 4, in embodiments. As illustrated, system 500 includes an originating computing device 502 ("originating device" 502) that sends an electronic communication message to a destination computing device 514 ("destination device" 514) via one or more networks (not shown for clarity and brevity) as similarly described above for FIG. 1. System 500 is shown as also including a proxy gateway 504, and a plurality of forward proxy servers: a forward proxy server A 506, a forward proxy server B 508, a forward proxy server C 510, and a forward proxy server D 512. Originating device 502 is illustrated as including a forward proxy application 516, described in further detail below and with reference to FIG. 7.

For embodiments herein, a proxy gateway such as proxy gateway 504, may be included as an initial entry point for incoming electronic communication messages, from originating computing devices such as originating device 502, which are handled by a chain of forward proxy servers prior to delivery to an ultimate destination computing device. In embodiments, proxy gateway 504 may perform one or more operations and/or functions as described herein, such as but without limitation, modifying or creating destination information for incoming electronic communication messages, and may be implemented at a separate server or computing device, or at a same server or computing device as one or more forward proxy servers described herein. That is, in embodiments, proxy gateway 504 is configured to modify an electronic communication message by adding a proxy chain identifier and an ordered set of one or more destinations to electronic communication messages received over a network and bound for destination device 514 based on routing rules and/or system settings. Additionally, proxy gateway 504 is configured to provide its modified electronic communication message to a forward proxy server that is determined as the first hop, either by the originating sender or by proxy gateway 504 itself. Modifications to destination information in electronic communication messages by proxy gateway 504 may include removal of an identifier for a forward proxy server that is a next hop from the destination information in a received electronic communication message such that when the next hop forward proxy server receives the electronic communication message from proxy gateway 504, its identifier is not listed in the ordered set of destinations.

In other embodiments, originating device 502 may provide electronic communication messages directly to forward proxy server A 506 when proxy gateway 504 is not implemented in system 500, as illustrated in FIG. 5 by the dotted connection line between originating device 502 and forward proxy server A 506. In some of these embodiments, forward proxy application 516 may operate similarly to proxy gateway 504, or may be an embodiment of proxy gateway 504, to facilitate provision of electronic communication messages directly to forward proxy server A 506.

Referring also now to FIG. 6, a flow diagram 600 for dynamic forward proxy chaining is shown, according to an example embodiment. Flow diagram 600 illustrates changes to destination information of an electronic communication message as it progresses from originating device 502 to destination device 514 via proxy gateway 504 and the forward proxy servers illustrated in FIG. 5.

As described above for system 500 of FIG. 5, originating device 502 provides an electronic communication message over a network(s) with destination device 514 as the intended, ultimate destination. Because proxy gateway 504 is implemented in FIG. 5 as the entry point for communications with destination device 514, the electronic communication message is first received at proxy gateway 504. For purposes of description with respect to FIG. 6 and flow diagram 600, an electronic communication message is referred to as a "packet." Flow diagram 600 first illustrates the incoming electronic communication message as a packet 602. Packet 602, provided from originating device 502, comprises a header and a payload with a basic HTTP GET request for an ultimate destination shown as an address of 1.2.3.4, with an exemplary port of 80, which corresponds to destination device 514. Proxy gateway 504, on receipt of packet 602, determines that forward proxy server A 506, forward proxy server B 508, and forward proxy server C 510 should be included as destination hops for packet 602, and modifies the destination information in the header of packet 602 to generate a packet 604, which is now a modified version of packet 602 having the same payload, to be provided to the first hop, i.e., forward proxy server A 506.

Packet 604 is illustrated as having a header that includes the modified destination information: a proxy chain identifier ("Chain_ID") that denotes an ordered set of next destinations as forward proxy server B 508 on port 8080 ("ProxyB:8080") and then forward proxy server C 510 on port 8080 ("ProxyC:8080"). In embodiments, the ultimate destination (as exemplarily shown) may also be included as associated with the ordered set, while in other embodiments it may be omitted. Additionally, as shown, proxy gateway 504 may add an HTTP CONNECT command with the destination information, as would be understood by those of skill in the relevant art(s) having the benefit of this disclosure. It should be noted that forward proxy server A 506 is not included in the destination information as packet 604 will be sent to forward proxy server A 506; however, in embodiments, forward proxy server A 506 could be included, e.g., as "ProxyA:8080," where forward proxy server A 506 is configured to identify and/or remove its own identifier from the ordered set after receiving packet 604.

As noted above, destination determiner 212 of system 200 in FIG. 2 may be configured to identify an identifier in the destination information that corresponds to the forward proxy server with which destination determiner 212 is associated, i.e., destination determiner 212 can identify its own forward proxy server in embodiments to determine the next destination, after its identifier, that is included in the order set of forward proxy servers. In embodiments where a forward proxy server might not modify the destination information, the identifier of the forward proxy server in the ordered set is identified by destination determiner 212, e.g., as shown in an alternate ordered set 605 with "ProxyA:8080," "ProxyB:8080," and "ProxyC:8080" for packet 604. In this example, forward proxy server A 506 may receive packet 604 having alternate ordered set 605 where forward proxy server A 506 identifies itself ("ProxyA:8080") in alternate ordered set 605 and thus identifies forward proxy server B 508 ("ProxyB:8080") as the next destination to which the received packet 604 is provided. In some cases, for this example, packet 604 may be provided to forward proxy server B 508 from forward proxy server A 506 without modifying the received packet.

As shown in system 500 of FIG. 5, proxy gateway 504 provides the electronic communication message, e.g., as packet 604 in FIG. 6, to forward proxy server A 506. Forward proxy server A 506 determines that the proxy chain identifier "Chain_ID" is present in packet 604, e.g., by chain identifier logic 210 in FIG. 2, and that the next hop in the ordered set of destinations is an identifier "ProxyB:8080" for forward proxy server B 508 on port 8080, e.g., by destination determiner 212 in FIG. 2, as shown in a packet 606 in FIG. 6. Forward proxy server A 506 is configured to perform one or more forward proxy server operations, based on its type of forward proxy server and/or a microservice associated therewith, and based on a result of such an operation(s), as illustrated in FIG. 6, may determine that the destination information should be modified, e.g., by forward proxy operator 220 in FIG. 2, for instance, in accordance with routing rules 222. As an illustrative example, it may be determined that the next hop should be forward proxy server D 512 instead of forward proxy server B 508, and that forward proxy server C 510 should receive its version of the packet on port 9090 rather than port 8080. Accordingly, as shown for a packet 606' that is thus modified by forward proxy server A 506, forward proxy server B 508 is no longer in the forward proxy server chain and its identifier is removed from the destination information, the next hop is to be forward proxy server D 512, and the identifier for forward proxy server C 510 is now "ProxyC:9090" in the generation of packet 606'. Because forward proxy server D 512 is the next hop, its identifier is not included in the destination information for the ordered set, in embodiments.

Accordingly, referring again to FIG. 5 and system 500, there is no electronic communication message provided from forward proxy server A 506 to forward proxy server B 508—rather, forward proxy server A 506 sends packet 606', as shown in FIG. 6, to forward proxy server D 512. In this example, forward proxy server D 512 determines that a forward proxy chain is implemented by determining proxy chain identifier "Chain_ID" is present in packet 606' as is the next hop from the ordered set of destinations, as similarly described above. Forward proxy server D 512 is configured to perform one or more of its own forward proxy server operations, and in the illustrated example, forward proxy server D 512 determines that the next destination hop should be forward proxy server C 510, on port 9090, as in received packet 606'. Forward proxy server D 512 is configured remove the identifier "ProxyC:9090" for forward proxy server C 510 in the destination information in the generation of a packet 608, leaving the ordered set empty, as shown in FIG. 6. In embodiments, a forward proxy server that modifies destination information to leave an empty ordered set in a packet, as shown for packet 608 and described for forward proxy server D 512, may also be configured to remove the proxy chain identifier from the packet.

Referring again back to FIG. 5, forward proxy server D 512 provides a packet, e.g., packet 608 in FIG. 6, to forward proxy server C 510. Forward proxy server C 510 may determine that proxy chain identifier "Chain_ID" is present in packet 608, but that the ordered set of destinations is empty, as shown for packet 608 in FIG. 6, or in other embodiments may determine that proxy chain identifier "Chain_ID" is not present if it was removed by forward proxy server D 512. Accordingly, forward proxy server C 510 determines that there is no forward proxy chaining to be performed, and subsequent to performing any of its forward proxy server operations, may generate a packet 610 without a proxy chain identifier and an ordered set of destinations, as shown in FIG. 6. As shown in reference to FIG. 5, forward proxy server C 510 provides a packet, e.g., packet 610 in FIG. 6, with its payload to the ultimate destination, e.g., destination device 514 as shown in FIG. 5.

In an alternate scenario for the embodiments illustrated in FIGS. 5 and 6, forward proxy server A 506 may determine that instead of replacing the identifier for forward proxy server B 508 with the identifier for forward proxy server D 512, and thus removing forward proxy server B 508 from the ordered set of the destination information, that forward proxy server D 512 should be added to the ordered set as the next hop destination before forward proxy server B 508. In such a scenario, the forward proxy server chain illustrated in system 500 of FIG. 5 would proceed from forward proxy server A 506 to forward proxy server D 512, and then to forward proxy server B 508 via the dashed vertical connection shown, and then to forward proxy server C 510 via the dashed horizontal connection shown. Correspondingly, with reference to FIG. 6 and flow diagram 600, packet 606' would include an ordered set of destinations similar to packet 606, i.e., still having the "ProxyB:8080" identifier before "ProxyC:9090" in the ordered set, and flow diagram 600 would include an additional packet between packet 606' and packet 608 with an ordered set of destinations that resembles that in packet 606' as illustrated with this additional packet being designated as Proxy B to Proxy C.

As noted above, originating device 502 includes forward proxy application 516, in embodiments. In the description herein for FIG. 1, originating devices are noted as being configured to perform functions/operations described herein, such as those for dynamic forward proxy chaining, in embodiments. That is, an originating device as described herein is configured to generate an electronic communication message, such as a packet, that includes an ordered set of two or more destination hops that correspond to forward proxy servers. In this way, a user of an originating device, or a proxy application itself, is enabled to dynamically specify a path for a forward proxy chain that the user desires to utilize for their communications with a destination device such as a host/server. Forward proxy application 516 is configured to perform operations and functions for such embodiments for dynamic forward proxy chaining, which may be similar to those described for forward proxy servers and/or proxy gateways herein; forward proxy application 516 may be an embodiment of forward proxy chain manager 208 of system 200 in FIG. 2 and/or of proxy gateway 504 of system 500 in FIG. 5. Accordingly, additional embodiments for client devices, e.g., originating devices such as originating device 102 in FIG. 1, originating device 502 in FIG. 5, etc., will now be described.

Figure 7:
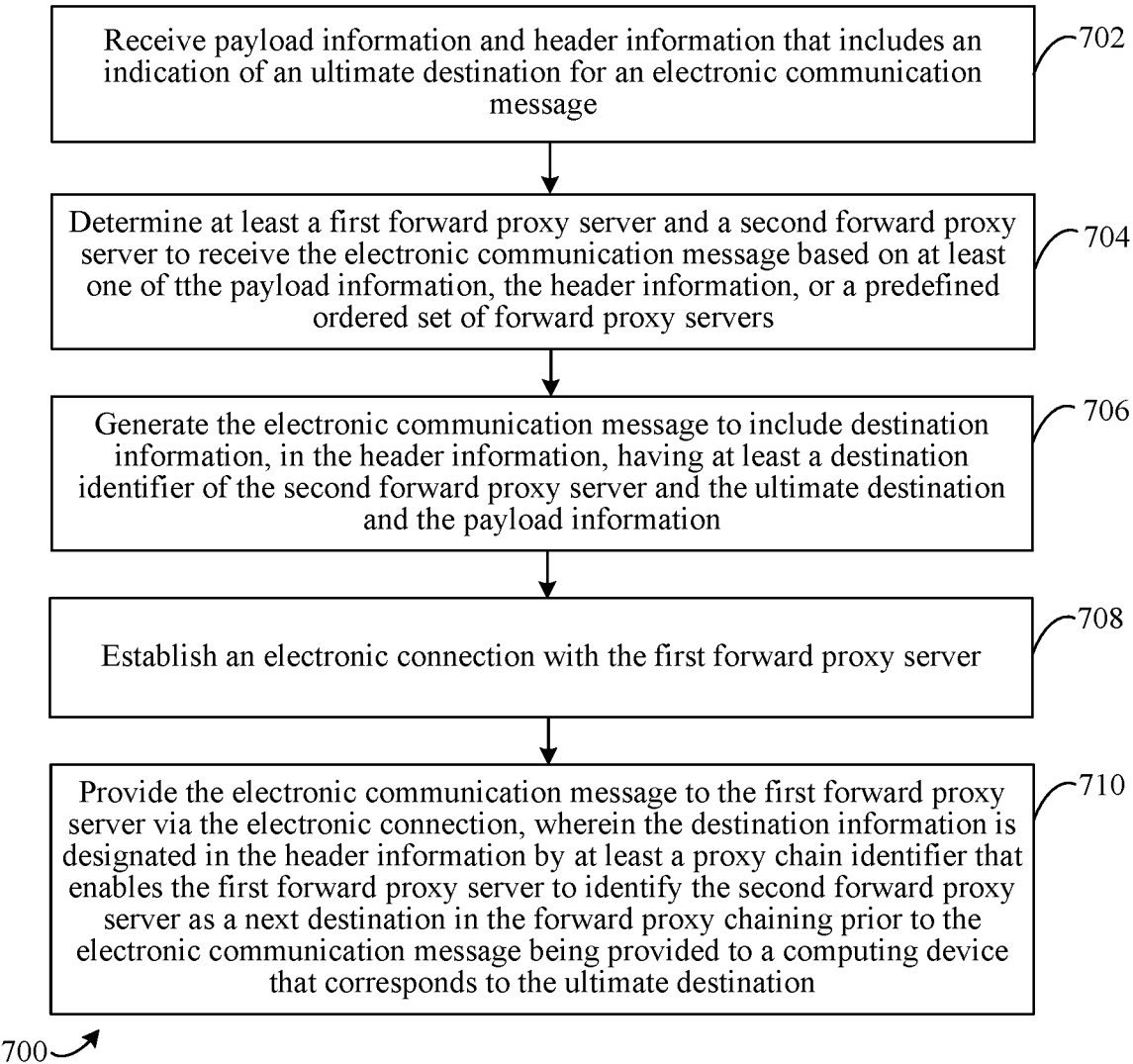
FIG. 7 shows a flowchart for dynamic forward proxy chaining, in accordance with an example embodiment.

For example, turning now to FIG. 7, a flowchart 700 for dynamic forward proxy chaining is shown, according to an example embodiment. Originating device 102 in FIG. 1 and/or originating device 502 in FIG. 5 operate according to flowchart 700. Further structural and operational examples will be apparent to persons skilled in the relevant art(s) based on the following descriptions. Flowchart 700 is described below with reference to system 500 of FIG. 5 and originating device 502.

Flowchart 700 begins at step 702. In step 702, payload information and header information that includes an indication of an ultimate destination for an electronic communication message is received. For instance, an originating device, i.e., a device from which an electronic communication message that will pass through a forward proxy server chain originates, may include a forward proxy application. As an example, originating device 502 in FIG. 5 includes forward proxy application 516. In embodiments, forward proxy application 516 is configured to receive message information, e.g., header and payload information for an electronic communication message, wherein the header information and/or the payload information includes an ultimate destination for the electronic communication message, or indicia thereof. Such information may be determined from initial electronic communication messages to be sent from a web browser and/or the like to a host server, as noted herein for originating device 102 in FIG. 1 and/or originating device 502 in FIG. 5. In some embodiments, an initial electronic communication message may be intercepted by forward proxy application 516, while in some embodiments an application such as a web browser may provide the information, or the initial electronic communication message itself, to forward proxy application 516 in order to perform one or more steps of flowchart 700. In embodiments, forward proxy application 516 may receive initial electronic communication messages, at originating device 502 from an application of originating device 502, similarly as would a proxy gateway, such as proxy gateway 504, receive electronic communication messages over a network that are bound for an ultimate destination computing device.

In step 704, at least a first forward proxy server and a second forward proxy server to receive the electronic communication message are determined based on at least one of the payload information, the header information, or a predefined ordered set of forward proxy servers. For example, forward proxy application 516 is configured to determine two or more forward proxy servers in a forward proxy server chain as destination hops for handling the electronic communication message prior to its provision to the ultimate destination computing device. Forward proxy application 516 determines the two or more forward proxy servers for the chain based on payload information (e.g., a type of payload, a destination indicated in the payload, etc.), header information, a predefined ordered set of forward proxy servers (which may be determined or set by a user or an administrator of originating device 502 or which may be selected from a list of available forward proxy servers, in embodiments), and/or the like.

In step 706, the electronic communication message is generated to include destination information, in the header information, having at least a destination identifier of the second forward proxy server and the ultimate destination and the payload information. For instance, forward proxy application 516 is configured to generate electronic communication messages that include destination identifiers of one or more subsequent hop forward proxy servers as well as the ultimate destination computing device. Electronic communication messages generated by forward proxy application 516 also include the payload information. In such embodiments, forward proxy application 516 performs functions as similarly described for proxy gateway 504 in its generation of packet 604 in FIG. 6. In some embodiments, forward proxy application 516 includes a proxy chain identifier in the generated electronic communication message that indicates an ordered set of forward proxy destinations is present for a forward proxy server chain.

In step 708, an electronic connection is established with the first forward proxy server. For example, forward proxy application 516 is configured to establish a connection with the first forward proxy server that is determined in step 704. This connection may be established by forward proxy application 516 over a network(s), including but not limited to the Internet.

In step 710, the electronic communication message is provide to the first forward proxy server via the electronic connection, wherein the destination information is designated in the header information by at least a proxy chain identifier that enables the first forward proxy server to identify the second forward proxy server as a next destination in the forward proxy chaining prior to the electronic communication message being provided to a computing device that corresponds to the ultimate destination. For instance, forward proxy application 516 is configured to provide the generated electronic communication message over a network(s) via the connection established in step 708 above. The destination information included in the provided electronic communication message is designated in the header information by a least a proxy chain identifier, in embodiments, and enables forward proxy chaining, as specified dynamically in the generated electronic communication message itself. That is, the destination information allows the first forward proxy server to identify the second forward proxy server as a next destination hop in the forward proxy server chain.

In this way, the identity and/or privacy of a user of originating device 502 is protected by obfuscating or anonymizing originating device 502 through a forward proxy server chain, of two or more forward proxy servers, which is determined by originating device 502. Additionally, users are provided with additionally network flexibility in embodiments where users are allowed to select two or more forward proxy servers for a chain at the outset, i.e., before the electronic message is provided from the originating computing device.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1, system 200 in FIG. 2, system 500 of FIG. 5, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 8 is a block diagram of an exemplary mobile system 800 that includes a mobile device 802 that may implement embodiments described herein. For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smartphone, handheld computer, Personal Digital Assistant (PDA), etc.) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of system 100 in FIG. 1, system 200 in FIG. 2, system 500 of FIG. 5, along with any components and/or subcomponents thereof, as well as the flowcharts/flow diagrams described herein, including portions thereof, and/or further examples described herein.

Mobile device 802 can include a mobile TPM 892. Mobile TPM 892 may be a mobile device equivalent embodiment of a TPM, as would be understood by one of skill in the relevant art(s) having the benefit of this disclosure. For example, mobile TPM 892 may be configured to perform one or more functions or operations of TPMs for various embodiments herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts herein. Computer program logic for performing any of the operations, steps, and/or functions described herein may be stored in memory 820 and executed by processor 810.

Figure 9:
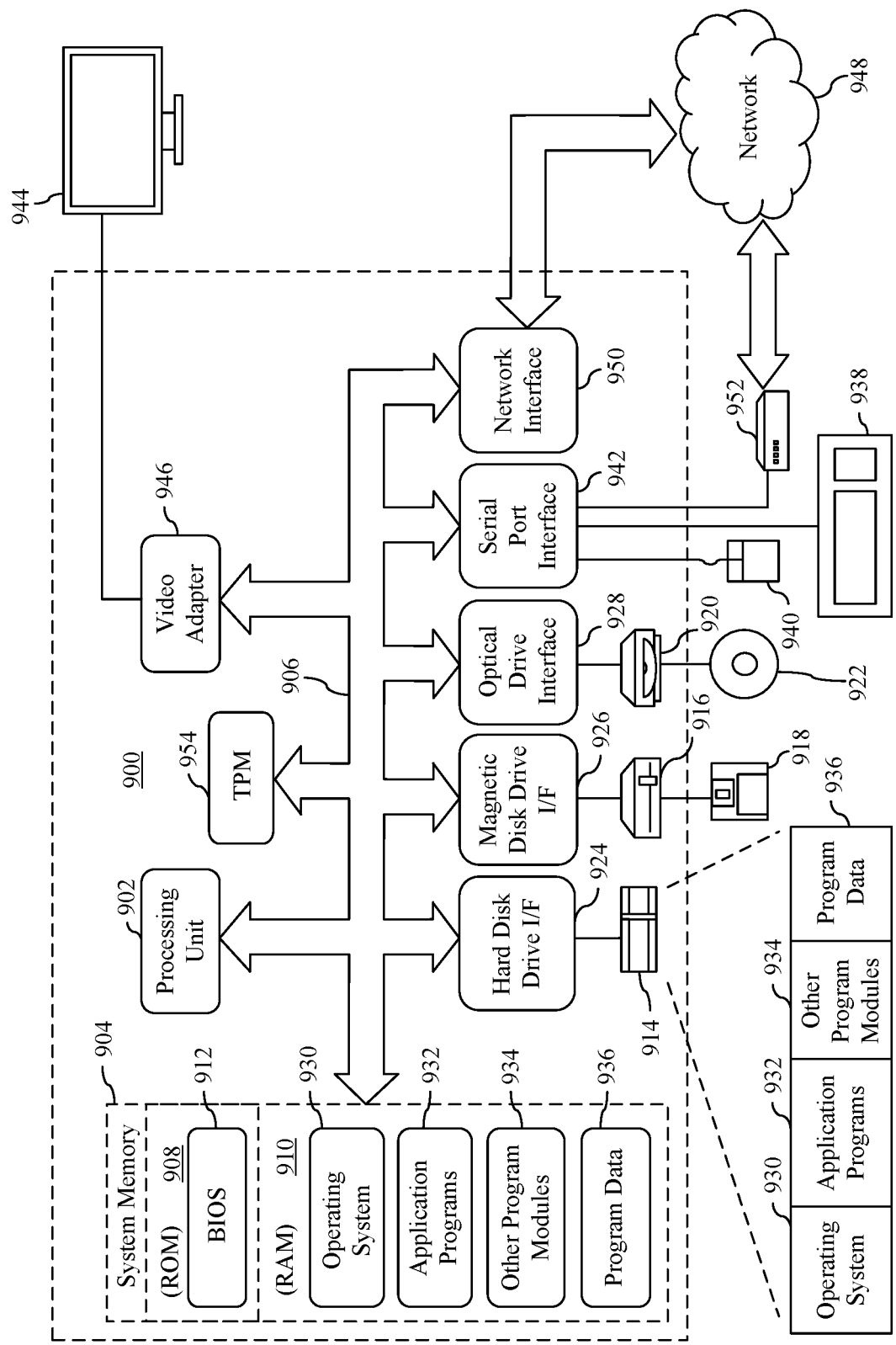
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices or systems similar to computing device 900, or multiple instances of computing device 900, in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, servers, and/or clusters, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, system 100 in FIG. 1, system 200 in FIG. 2, system 500 of FIG. 5, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

TPM 954 may be connected to bus 906, and may be an embodiment of any TPM, as would be understood by one of skill in the relevant art(s) having the benefit of this disclosure. For example, TPM 954 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for dynamic forward proxy chaining. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

According to the described embodiments for dynamic forward proxy chaining, an originating computing device, e.g., a client device, is enabled to protect the identity and/or privacy for a user thereof by obfuscating or anonymizing the originating computing device as the message originator through a forward proxy server chain, of two or more forward proxy servers, that is determined by the originating computing device.

The embodiments herein provide for network bandwidth efficiencies in implementations of forward proxy servers, as well as increases in speed of processing electronic communications through forward proxy servers coupled to microservices. For example, rather than implementing a single proxy interface that transmits messages between different forward proxies over an internal network, the embodiments herein provide for the ability of a forward proxy server chain to be implemented at a single server with microservices where the forward proxy servers communicate "intra-server" with each other. This greatly reduces network bandwidth utilization, and also increases the processing speed of incoming messages as the speed of processing is only limited by the speed of the operating system for the server and the system bus.

The embodiments herein utilize a unique framework and methodology for designating multiple destination hops in a forward proxy server chain, at the generation of electronic communication messages, as well as dynamically modifying destination hops during flight through the chain by individual forward proxy servers, while providing resource efficiencies for network traffic related to forward proxy servers that were previously not available for software-based services, much less for the specific embodiments described herein performed by originating computing devices and forward proxy servers. The described embodiments are also adaptable to implementations of scaled out microservices which provides system-wide flexibility and plug-in additions for different forward proxy servers to an existing system.

The additional examples and embodiments described in this Section may be applicable to examples disclosed in any other Section or subsection of this disclosure.

Embodiments in this description provide for systems, devices, and methods for dynamic forward proxy chaining. For instance, a method performed by a forward proxy system is described herein for performing such embodiments. The method includes receiving, at a forward proxy server, an electronic communication message that comprises header information that includes at least destination information, the destination information comprising an ultimate destination identifier and an ordered set that includes at least one of a destination identifier of the forward proxy server or at least one subsequent destination identifier respectively associated with at least one subsequent forward proxy server. The method also includes establishing an electronic connection with a next destination by the forward proxy server based on the destination information, and providing the electronic communication message to the next destination by the forward proxy server via the electronic connection.

In an embodiment of the method, the destination information includes, in the ordered set, the destination identifier of the forward proxy server, and the method further incudes identifying in the ordered set, by the forward proxy server, the destination identifier of the forward proxy server, and determining, by the forward proxy server, the next destination based at least on the ordered set said identifying.

In an embodiment of the method, the forward proxy server and the at least one subsequent forward proxy server comprise respective microservices.

In an embodiment of the method, the destination information is designated in the header information by at least a proxy chain identifier, and the method further includes receiving at a proxy gateway an initial electronic communication message from an originating sender, the initial electronic communication message including the ultimate destination identifier as the destination information, generating the electronic communication message from the initial electronic communication message by adding the proxy chain identifier to the initial electronic communication message and adding the ordered set to the destination information, and providing the electronic communication message to the forward proxy server.

In an embodiment, the method includes modifying the destination information in the electronic communication message by the forward proxy server prior to establishing the electronic connection. In a further embodiment, the modifying includes adding a subsequent destination identifier to the at least one subsequent destination identifier in the ordered set, and the method further includes performing a first proxy server operation by the forward proxy server prior to said modifying, and performing at least one second proxy server operation by an added subsequent forward proxy server that corresponds to the added subsequent destination identifier after said providing the electronic communication message to the next destination.

In an embodiment of the method, the modifying the destination information by the forward proxy server includes at least one of removing an identifier of the forward proxy server from the destination information, removing a first subsequent destination identifier from the destination information, adding a second subsequent destination identifier to the at least one subsequent destination identifier, replacing a first one of the at least one subsequent destination identifier with a third subsequent destination identifier, or altering a port identifier of a second one of the at least one subsequent destination identifier.

In an embodiment of the method, the modifying the destination information by the forward proxy server is performed based on a routing rule and an analysis of at least one of data in payload information of the electronic communication message, a command or request in the payload information, an identifier associated with an originating sender in the electronic communication message, or an operational status of another forward proxy server associated with one of the least one subsequent destination identifier.

In an embodiment of the method, the receiving at the forward proxy server the electronic communication message comprises receiving the electronic communication message from an originating sender over a network.

A system is also described herein. The system may be configured and enabled in various ways for dynamic forward proxy chaining, as described herein. In an embodiment, the system includes a processing system that includes one or more processors, and a memory that stores computer program instructions, comprising forward proxy server instructions, that when executed, configure the processing system to receive, at a forward proxy server of the system, an electronic communication message that comprises header information that includes at least destination information, modify the destination information in the electronic communication message by the forward proxy server to generate a modified electronic communication message, establish an electronic connection to a next destination by the forward proxy server based on the destination information or the modified destination information, and provide the modified electronic communication message to the next destination by the forward proxy server via the electronic connection.

In an embodiment of the system, the destination information comprises an ordered set of at least one subsequent destination identifier respectively associated with at least one subsequent forward proxy server of the system, and an ultimate destination identifier.

In an embodiment of the system, to modify the destination information, the processing system is configured to remove a subsequent destination identifier, of the at least one subsequent destination identifier, that corresponds to the next destination from the ordered set, and the processing system is further configured to perform a first proxy server operation by the forward proxy server prior to the destination information being modified, perform at least one second proxy server operation by the at least one subsequent forward proxy server that corresponds to the next destination after the modified electronic communication message is provided to the next destination, and provide an ultimate electronic message, by the at least one subsequent forward proxy server that corresponds to the next destination, to a computing device that corresponds to the ultimate destination identifier, the ultimate electronic message comprising the ultimate destination identifier in the destination information and payload information of the electronic communication message.

In an embodiment of the system, the forward proxy server and the at least one subsequent forward proxy server comprise respective microservices.

In an embodiment of the system, the destination information is designated in the header information by at least a proxy chain identifier, and the processing system further configured to receive at a proxy gateway of the system an initial electronic communication message from an originating sender, the initial electronic communication message including the ultimate destination identifier as the destination information, generate the electronic communication message from the initial electronic communication message, including to add the proxy chain identifier to the destination information and add the at least one subsequent destination identifier to the destination information as part of the ordered set, and provide the electronic communication message to the forward proxy server.

In an embodiment of the system, to modify the destination information by the forward proxy server, the processing system is configured to remove an identifier of the forward proxy server from the destination information, remove a first subsequent destination identifier from the destination information, add a second subsequent destination identifier to the at least one subsequent destination identifier, replace a first one of the at least one subsequent destination identifier with a third subsequent destination identifier, or alter a port identifier of a second one of the at least one subsequent destination identifier.

In an embodiment of the system, to modify the destination information by the forward proxy server includes to modify the destination information based on a routing rule and an analysis of at least one of data in payload information of the electronic communication message, a command or request in the payload information, an identifier associated with an originating sender in the electronic communication message, or an operational status of another forward proxy server associated with one of the least one subsequent destination identifier.

In an embodiment of the system, the electronic communication message is received at the forward proxy server from an originating sender over a network.

A computer-readable storage medium having program instructions recorded thereon that, when executed by a processing system, performs a method, is also described. The method is for dynamic forward proxy chaining and/or forward proxy chaining, as described herein. The method includes receiving payload information and header information that includes an indication of an ultimate destination for an electronic communication message, and determining at least a first forward proxy server and a second forward proxy server to receive the electronic communication message based on at least one of the payload information, the header information, or a predefined ordered set of forward proxy servers. The method also includes generating the electronic communication message to include destination information, in the header information, having at least a destination identifier of the second forward proxy server and the ultimate destination and the payload information, establishing an electronic connection with the first forward proxy server, and providing the electronic communication message to the first forward proxy server via the electronic connection.

In an embodiment of the computer-readable storage medium, the at least a destination identifier of the second forward proxy server and the ultimate destination comprise an ordered set of destinations.

In an embodiment of the computer-readable storage medium, the destination information is designated in the header information by at least a proxy chain identifier that enables the first forward proxy server to identify the second forward proxy server as a next destination in the forward proxy chaining prior to the electronic communication message being provided to a computing device that corresponds to the ultimate destination.

In an embodiment of the computer-readable storage medium, for the method, receiving the header information includes receiving the header information in an initial electronic communication message, that specifies the ultimate destination as an only destination, from a software application at the originating sender, and generating the electronic communication message includes generating from the initial electronic communication message by adding the proxy chain identifier to the destination information and adding the at least a destination identifier of the second forward proxy server as part of the ordered set.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a first Hypertext Transfer Protocol (HTTP) forward proxy server in a forward proxy server chain, the method comprising:
   receiving an electronic communication message that comprises header information that includes destination information, the destination information comprising:
   an ultimate destination identifier,
   a destination identifier of the first HTTP forward proxy server, and
   a first subsequent destination identifier associated with a second HTTP forward proxy server subsequent to the first HTTP forward proxy server in the forward proxy server chain;
   establishing an electronic connection with a next destination in the forward proxy server chain based on the destination information; and
   providing the electronic communication message to the next destination via the electronic connection.

2. The method of claim 1, further comprising:
   identifying in the destination information the destination identifier of the first HTTP forward proxy server; and
   determining the next destination in the forward proxy server chain based on said identifying.

3. The method of claim 1, wherein the first HTTP forward proxy server and the second HTTP forward proxy server comprise respective microservices.

4. The method of claim 1, wherein the destination information is designated in the header information by a proxy chain identifier.

5. The method of claim 1, further comprising:
modifying the destination information in the electronic communication message prior to establishing the electronic connection.

6. The method of claim 5, wherein:
said modifying includes adding a second subsequent destination identifier to the destination information, the second subsequent destination identifier associated with a third HTTP forward proxy server subsequent to the first HTTP forward proxy server in the forward proxy server chain.

7. The method of claim 5, wherein modifying the destination information by the first HTTP forward proxy server includes:
removing an identifier of the first HTTP forward proxy server from the destination information;
removing the first subsequent destination identifier from the destination information;
adding a second subsequent destination identifier to the destination information;
replacing the first subsequent destination identifier with a third subsequent destination identifier; or
altering a port identifier of a second subsequent destination identifier.

8. The method of claim 5, wherein modifying the destination information is performed based on a routing rule and an analysis of:
data in payload information of the electronic communication message;
a command or request in the payload information;
an identifier associated with an originating sender in the electronic communication message; or
an operational status of the second HTTP forward proxy server.

9. The method of claim 5, wherein:
the next destination is the second HTTP forward proxy server; and
said modifying includes removing the first subsequent destination identifier from the destination information.

10. A first HTTP forward proxy server in a forward proxy server chain, the first HTTP forward proxy server comprising:
a processing system comprising one or more processors; and
a memory that stores program instructions, comprising forward proxy server instructions, that when executed by the processing system, the processing system:
receives an electronic communication message that comprises header information that includes destination information, the destination information comprising:
a first subsequent destination identifier associated with a second HTTP forward proxy server subsequent to the first HTTP forward proxy server in the forward proxy server chain, and
an ultimate destination identifier;
modifies the destination information in the electronic communication message to generate a modified electronic communication message;
establishes an electronic connection to a next destination in the forward proxy server chain based on the destination information or the modified destination information; and
provides the modified electronic communication message to the next destination via the electronic connection.

11. The first HTTP forward proxy server of claim 10, wherein:
the next destination is the second HTTP forward proxy server;
the processing system modifies the destination information by removing the first subsequent destination identifier from the destination information.

12. The first HTTP forward proxy server of claim 10, wherein the first HTTP forward proxy server and the second HTTP forward proxy server comprise respective microservices.

13. The first HTTP forward proxy server of claim 10, wherein the destination information is designated in the header information by at least a proxy chain identifier.

14. The first HTTP forward proxy server of claim 10, wherein the processing system modifies the destination information by:
removing an identifier of the first HTTP forward proxy server from the destination information;
removing the first subsequent destination identifier from the destination information;
adding a second subsequent destination identifier to the destination information;
replacing the first subsequent destination identifier with a third subsequent destination identifier; or
altering a port identifier of a second subsequent destination identifier.

15. The first HTTP forward proxy server of claim 10, wherein the processing system modifies the destination information by modifying the destination information based on a routing rule and an analysis of:
data in payload information of the electronic communication message;
a command or request in the payload information;
an identifier associated with an originating sender in the electronic communication message; or
an operational status of the second HTTP forward proxy server.

16. The first HTTP forward proxy server of claim 10, wherein the processing system receives the electronic communication message from an originating sender over a network.

17. A computer-readable storage medium having program instructions recorded thereon that, when executed by a processing system, perform a method of dynamic forward proxy chaining, the method comprising:
receiving payload information and header information that includes an indication of an ultimate destination for an electronic communication message;
determining a first HTTP forward proxy server and a second HTTP forward proxy server, the second HTTP forward proxy server subsequent to the first HTTP forward proxy server in a forward proxy server chain, to receive the electronic communication message based on the payload information, the header information, or a predefined order of HTTP forward proxy servers in the forward proxy server chain;
generating the electronic communication message to include:
destination information, in the header information, having at least a destination identifier of the second HTTP forward proxy server and the ultimate destination; and
the payload information;

establishing an electronic connection with the first HTTP forward proxy server; and providing the electronic communication message to the first HTTP forward proxy server via the electronic connection.

18. The computer-readable storage medium of claim 17, wherein the destination information is designated in the header information by at least a proxy chain identifier that enables the first HTTP forward proxy server to identify the second HTTP forward proxy server as a next destination in the forward proxy server chain prior to the electronic communication message being provided to a computing device that corresponds to the ultimate destination.

19. The computer-readable storage medium of claim 18, wherein receiving the header information comprises receiving the header information in an initial electronic communication message, that specifies the ultimate destination as an only destination, from a software application at the originating sender; and wherein generating the electronic communication message comprises generating from the initial electronic communication message by:

adding the proxy chain identifier to the destination information; and adding the destination identifier of the second HTTP forward proxy server the destination information.

20. The first HTTP forward proxy server of claim 10, wherein the processing system modifies the destination information by adding a second subsequent destination identifier to the destination information, the second subsequent destination identifier associated with a third HTTP forward proxy server subsequent to the first HTTP forward proxy server in the forward proxy server chain, the second HTTP forward proxy server subsequent to the third HTTP forward proxy server in the forward proxy server chain.

* * * * *